DECIMAL-POINT INDICATING SYSTEM FOR ELECTRONIC CALCULATOR

Filed Oct. 3, 1967 4 Sheets-Sheet 1

Stefan Hristov ANGELOV
Snejanka Vladimirova HRISTOVA
Srebryu Yovtchev SREBRYU
INVENTORS BY Karl F. Ross
Attorney Stefan Hristov ANGELOV
Snejanka Vladimirova HRISTOVA
Srebryu Yovtchev SREBRYU

INVENTORS

BY Karl G. Ross
Attorney

S. H. ANGELOV
S. V. HRISTOVA
S. Y. SREBRYU
INVENTORS

BY Karl F. Ross
Attorney

Stefan Hristov ANGELOV
Snejanka Vladimirova HRISTOVA
Srebryu Yovtchev SREBRYU

INVENTORs

BY Karl F. Ross
Attorney

United States Patent Office 3,548,180

Patented Dec. 15, 1970

3,548,180

DECIMAL-POINT INDICATING SYSTEM FOR ELECTRONIC CALCULATOR

Stefan Hristov Angelov, Snejanka Vladimirova Hristova, and Srebryu Yovtchev Srebev, Sofia, Bulgaria, assignors to Zentralen Institut Po Istchislitelna Technika, Sofia, Bulgaria, a corporation of Bulgaria Filed Oct. 3, 1967, Ser. No. 672,500
Claims priority, application Bulgaria, Oct. 4, 1966, I-1,175
Int. Cl. G06f 7/48
U.S. Cl. 235—159 2 Claims

ABSTRACT OF THE DISCLOSURE

An electronic calculator with a normal magnetic-core storage with the usual lines and columns for recording numerical information is provided with an additional line into which the decimal position is registered by a flip-flop which, under one hand, resets all of the position of the additional line to "0" and therefore registers a "1" in the appropriate position. This sequence is followed to advance the decimal point with each recordal of a digit. Decimal point indication is by neon lamps between the counter tubes.

The invention relates to electric circuits for controlling and indicating the decimal point in electronic calculators.

There are known electric circuits for electronic calculators, in which the processing and holding of the decimal point is performed by means of a special counter irrespective of the type of the storage register. Such registers include circuit storage, magnetic-core storage or delay-line storage. The inconvenience of all those circuits lies in the fact that they require the use of different information paths and circuits for processing the digital information with which the calculator operates and for handling the decimal point, thus increasing the size of the circuit needed in the computer.

The object of the invention is to unify the information paths and circuits needed for processing the digital information and the decimal point, thus reducing the number of circuits which are used in the electronic calculator.

This object is achieved by means of using a separate additional line of the magnetic-core storage registers to carry, hold, process, and indicate the decimal point.

The information about the presence of the decimal point is recorded by writing "one" in the respective column in the additional line of the magnetic-core storage, while all other columns are set at zero. The introduction of the information concerning the decimal point is performed by depression of a special key of the calculator's key-board. The position of the decimal point in the result is determined in the various operations by means of one-shot (monostable) multivibrators, flip-flop circuits, and conditional differentiating groups. The indication is carried out by the illumination of neon bulbs by part of the circuit needed for digital indication.

The invention is explained in detail below with reference to the accompanying drawing in which.

Figure 1:
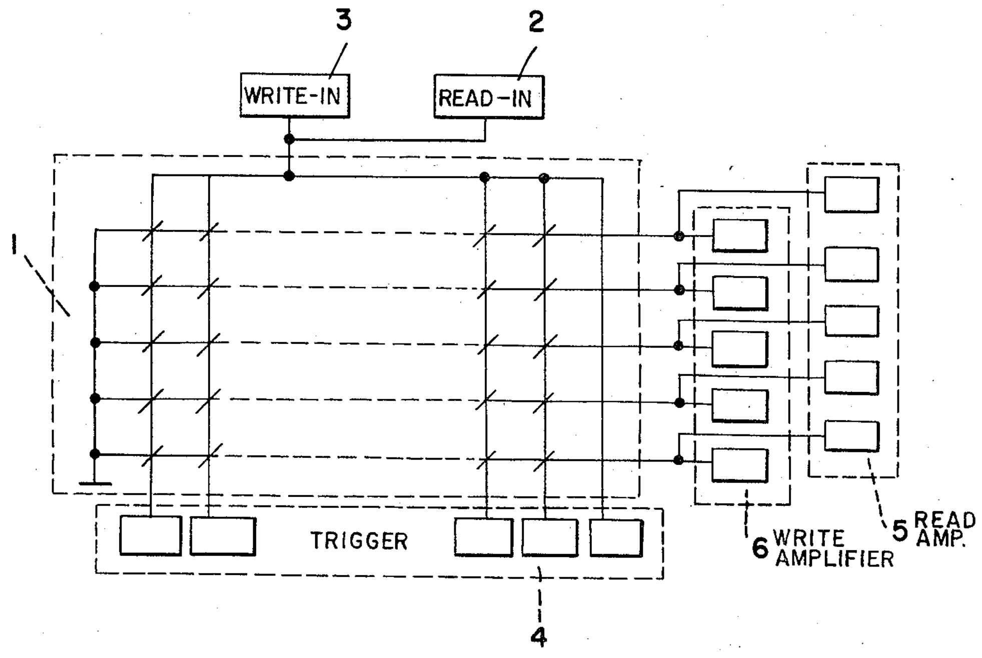
FIG. 1 is a block diagram of the magnetic-core storage according to the invention.

FIG. 1 shows a block diagram of the magnetic-core storage 1 including the read-pulse generator 2, the write pulse generator 3, the trigger circuits 4, the read amplifier 5, and the write amplifier 6.

Figure 2:
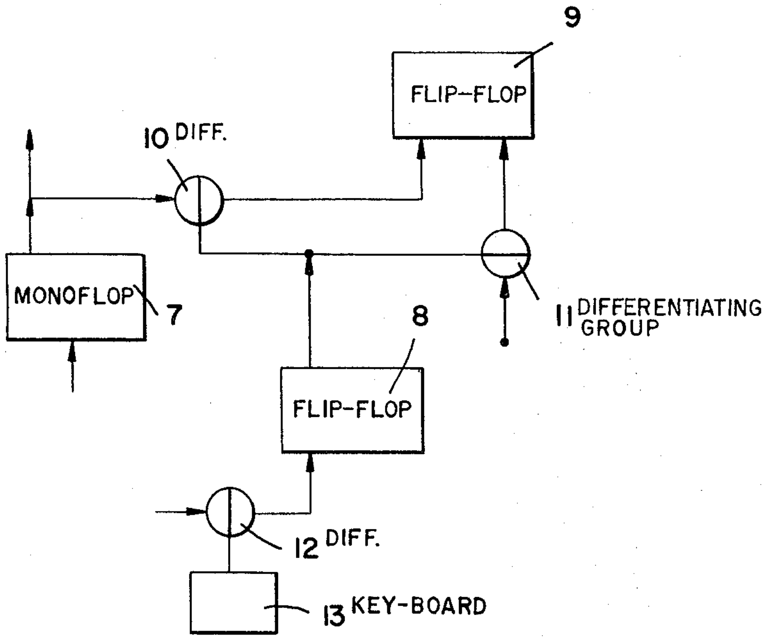
FIG. 2 is a block diagram illustrating the insertion of the decimal point information.

FIG. 2 represents a circuit for the carrying of the decimal point information and comprising a one-shot multivibrator 7, the flip-flop circuits 8 and 9, the conditional differentiating groups 10, 11 and 12, and a key of the computer's key-board 13 for carrying-in the decimal point.

Figure 3:
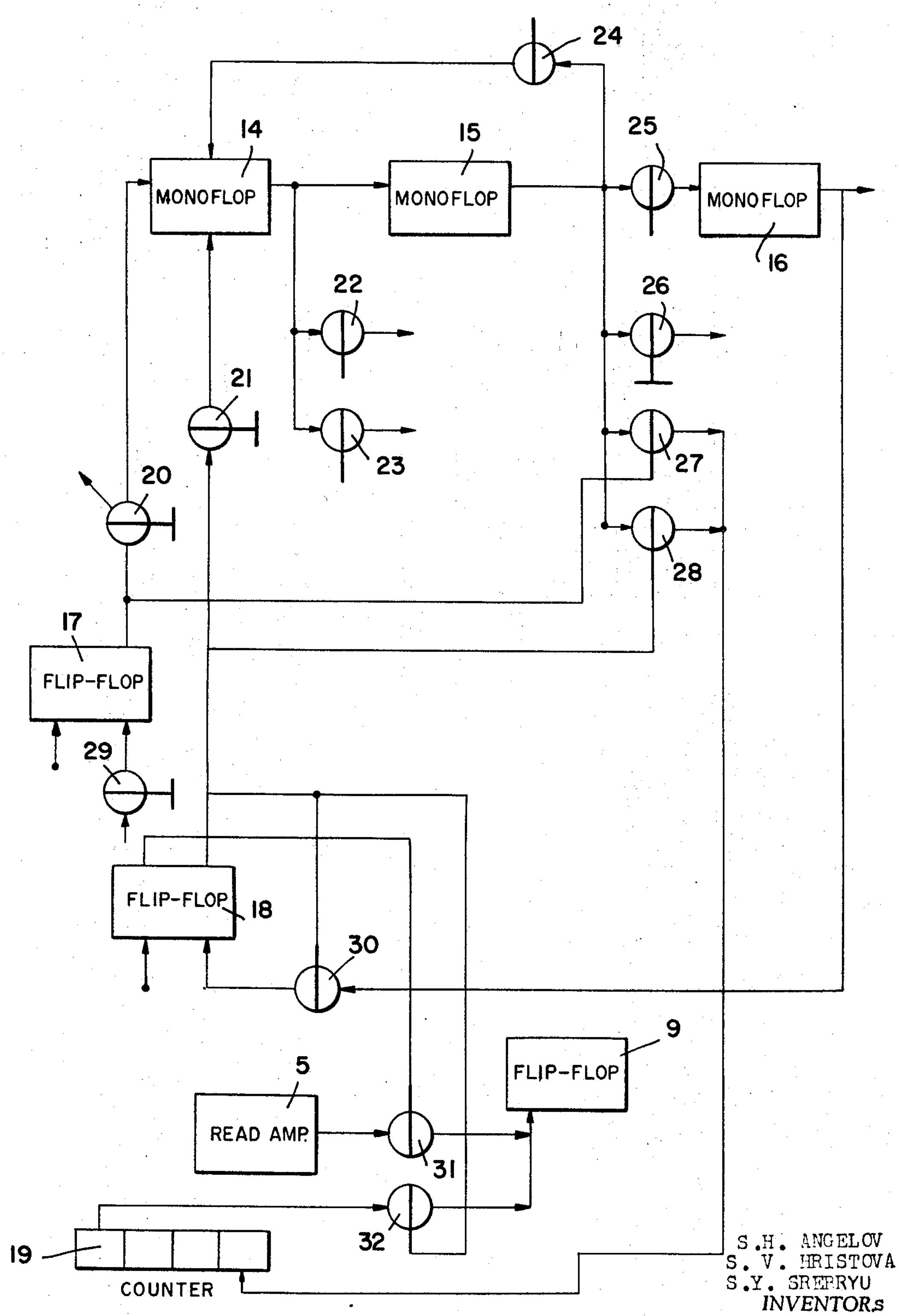
FIG. 3 is a block diagram of the read-out system.

In FIG. 3 is shown a circuit for determining the decimal-point position of the results during the various operations and for recording the decimal point in the output register, the diagram containing the one-shot multivibrators 14, 15 and 16, the flip-flop circuits 17 and 18, the trigger counter 19, and the conditional differentiating groups 20 to 32.

Figure 4:
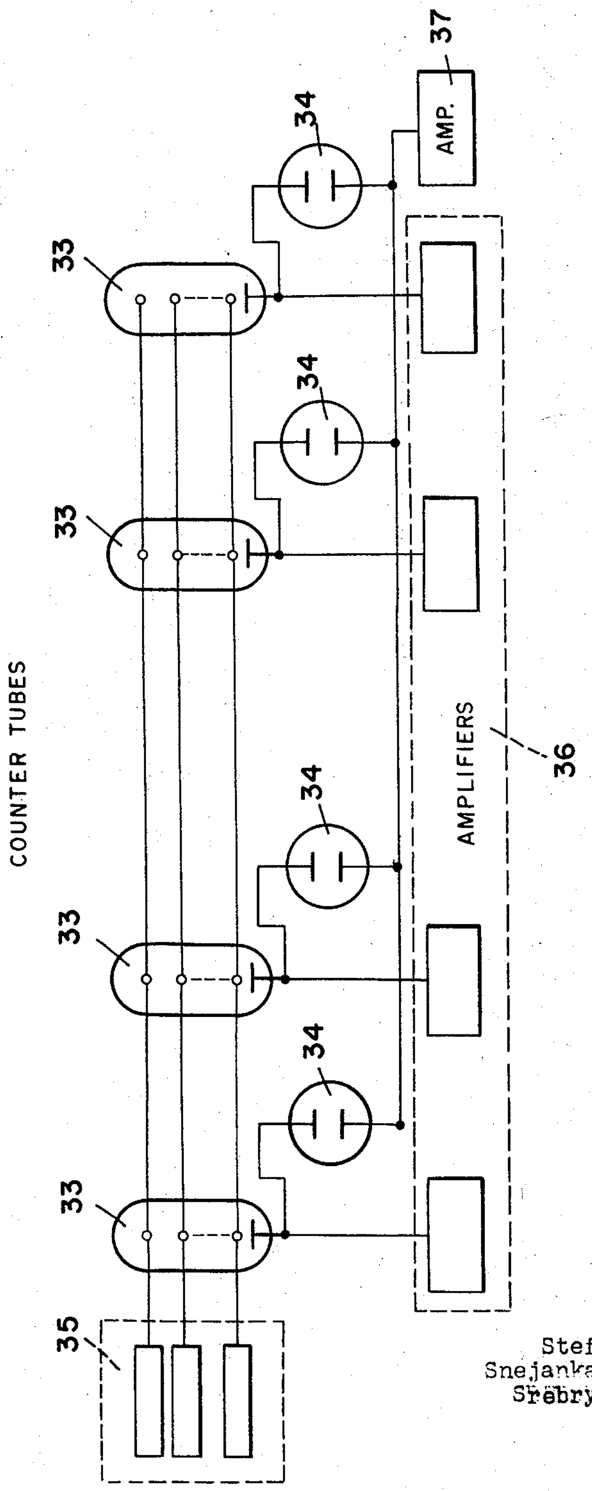
FIG. 4 is a diagram of the indicating means.

The system of FIG. 4 performs the decimal-point indication and includes counter tubes 33 for digital indication of the result, neon bulbs 34 for decimal-point indication and the means for controlling the neon bulbs-amplifiers for the digits 35, amplifiers for the columns 36, and an amplifier for the decimal-point 37.

The information about the presence or absence of the decimal point is stored in the additional line (the 5 line in a code 1, 2, 4, 8) of the magnetic-core storage register (FIG. 1). The reading, writing and shifting of the decimal point is carried out by the same means and in the same way as in the case of the digits. See application Ser. No. 672,501 filed concurrently herewith.

The decimal-point information is carried in by means of the calculator's board using the circuit diagram shown on FIG. 2. At first the flip-flop circuit 8 is in the zero state and gives authorizing potentials to the conditional differentiating groups 10 and 11. Simultaneously with every carried-in digit the one-shot multivibrator 7 turns the flip-flop circuit 9 into the "one" state, and the circuit 9 advances the "one" writing in the respective position of the additional line of the store. In the time interval betwen the reading and the regeneration of the preceding position, in which also a "one" is recorded in the decimal-point bit of the preceding digit, a pulse is generated switching the flip-flop circuit 9 into the zero state by means of the conditional differentiating group 11. During the regeneration a "one" is not recorded in the decimal-point bit thus erasing of the decimal point carried in with the preceding digit. By pushing down the decimal-point key the flip-flop circuit 8 is switched into the "one"state. The conditions of the differentiating groups 10 and 11 become inhibiting thus stopping the carrying-in of the decimal point with the following digits and the erasing of the decimal point carried in with the preceding digit. The circuit prevents the carrying-in of the decimal point in more than one position in case of eventual repeated pushing down of the above mentioned key.

The decimal-point position in the result is determined by means of the circuit shown in FIG. 3, which performs the addition or the substraction of the orders of the output digits repending on the specific operation in the usual way. This circuit serves for storing information about the sequence of the result in a reversible counter and for transferring its contents into the output register. To determine the order of the result the flip-flop circuit 17 is put into the "one" state. It fixes the necessary state of the flip-flop circuit for controlling the reversible counter and puts in action the one-shot multivibrator 14. The pair of one-shot multivibrators 14 and 15 generate a series of pulses needed to read all positions of the registers. The one-shot multivibrator 14 passes pulses through the groups 22 or 23 for reading the one or the other number respectively. The one-shot multivibrator 15 passes a pulse through the group 26 for regeneration of the read information and another pulse through the group 27 into the reversible counter 19. When the cummulative system reads information about the decimal point through the group 29, the flip-flop circuit 17 is switched into the zero state. It gives an inhibiting potential to the differentiating group 27 and interrupts the further passing of pulses into the counter 19. This results in the contents of the counter being equal to the order of the processed number. The order of the other number is processed in a similar way.

In order to transfer the obtained order of the result from the counter 19 into the output register, the flip-flop circuit 18 is switched into the "one" state. It determines the necessary state of the flip-flop circuit controlling the reversible counter and puts in action the one-shot multivibrator 14. During the reading of every position of the output register by the one-shot multivibrator 15 a "one" is added through the group 28 into the reversible counter 19. While the flip-flop circuit remains in the "one" state, the differentiating group 31 has an inhibiting potential, and the read amplifier 5 passes no signals into the flip-flop circuit 9. In this way the erasing of the previous decimal point information in the register is achieved. After passing a fixed quantity of pulses into the counter 19, it goes from the "1111" state into the "0000" state, and a pulse is generated switching the flip-flop circuit 9 through the group 32 into the "one" state. This flip-flop circuit creates the condition of recording a "One" in the additional line of the register of the respective column.

In order to indicate the decimal-point position neon bulbs are used as shown in FIG. 4. One electrode of all the neon bulbs 34 is connected to the amplifier 37, which receives information from the additional line of the store. The other electrode is connected to the anode of the respective counter tube 33 and to the amplifiers 36 for exciting the decade counter tubes 33.

The circuits for carrying in, holding, processing and indication of the decimal point offer an economical solution of the problem and may be applied in the small electronic computers of the desk type, i.e. in the electronic calculators.

What we claim is:

1. In an electronic calculator having a magnetic-core storage, with digit-registering lines and bit-registering columns crossing said lines, means for reading information bits into said magnetic-core storage along at least some of said lines to register numerical information therein, means including shift registers and counter tubes for processing said information and displaying mathematical results, and decimal-point control circuit for manipulating the decimal point of the displayed information, the improvement which comprises at least one further line of said magnetic-core storage having a multiplicity of columns corresponding to digits of numerical values stored in the other lines and columns of the magnetic-core storage; read-in means for erasing information stored in said further line and applying a "1" to said line in step with the recordal of successive digits of a numerical value registered in said magnetic-core storage; and means for displaying the decimal point in dependence upon the position of said "1" along said line.

2. The improvement defined in claim 1, further comprising a flip-flop circuit (9) switchable for applying said "1" to a respective position along said line and reversible to record a "0" in all of the positions along said line prior to recordal of said "1"; a conditional differentiating group (10) connected to said flip-flop circuit; a one-shot multivibrator (7) operatively connected to said conditional differentiating group and triggerable into an "on" state to enable said flip-flop circuit to read said "1" into said further line; a further conditional differentiating group (11) connected to said one shot multivibrator; a further flip-flop circuit (8) connected to said differentiaing groups for controlling same to apply pass or inhibition signals thereto; push-button means (13) forming part of an electronic calculator keyboard for controlling said further flip-flop circuit; a multiplicity of neon lamps (34) between said counter tubes forming said means for displaying said decimal point; amplifier means connected with said counter tubes, said counter tubes each having an anode connected with one terminal of one of said neon lamps, another terminal of each of said neon lamps being connected to a common amplifier; and scanning means including flip-flop circuits for counting down the columns of said further line to the decimal-point position for operating the corresponding neon lamp.

References Cited

UNITED STATES PATENTS

| | | | |
|---|---|---|---|
| 3,074,635 | 1/1963 | Borne et al. | 235—156 |
| 3,375,356 | 3/1968 | Scuitto et al. | 235—160 |

MALCOLM A. MORRISON, Primary Examiner

D. H. MALZUHN, Assistant Examiner

U.S. Cl. X.R.

235—160